United States Patent
Nakahara

(10) Patent No.: US 7,657,169 B2
(45) Date of Patent: Feb. 2, 2010

(54) FOCUS DETECTION METHOD AND FOCUS DETECTION DEVICE

(75) Inventor: Naoto Nakahara, Saitama (JP)

(73) Assignee: Hoya Corporation, Tokyo (JP)

( * ) Notice: Subject to any disclaimer, the term of this patent is extended or adjusted under 35 U.S.C. 154(b) by 283 days.

(21) Appl. No.: 11/757,428

(22) Filed: Jun. 4, 2007

(65) Prior Publication Data

US 2007/0280665 A1  Dec. 6, 2007

(30) Foreign Application Priority Data

Jun. 5, 2006  (JP) .............................. 2006-155908

(51) Int. Cl.
*G03B 3/10* (2006.01)
*G03B 13/34* (2006.01)
(52) U.S. Cl. ...................... 396/121; 396/133
(58) Field of Classification Search ................ 396/116, 396/121, 124, 127, 133; 348/349, 353
See application file for complete search history.

(56) References Cited

U.S. PATENT DOCUMENTS

| 2001/0010556 A1* | 8/2001 | Sugimoto et al. ........... 348/345 |
| 2005/0280734 A1 | 12/2005 | Nakahara |
| 2006/0078323 A1 | 4/2006 | Nakahara |

FOREIGN PATENT DOCUMENTS

| JP | 2002072074 | 3/2002 |
| JP | 2002311325 | 10/2002 |

OTHER PUBLICATIONS

English language Abstract of JP 2002-072074.
English language Abstract of JP 2002-311325.
U.S. Appl. No. 11/754,506 to Nakahara, filed May 29, 2007.
U.S. Appl. No. 11/757,419 to Nakahara, filed Jun. 4, 2007.

* cited by examiner

*Primary Examiner*—W. B. Perkey
*Assistant Examiner*—Minh Q Phan
(74) *Attorney, Agent, or Firm*—Greenblum & Bernstein P.L.C.

(57) ABSTRACT

A focus detection method includes moving a focusing lens group from the near extremity toward the far extremity in a search operation, and stopping the focusing lens group upon first detecting an in-focus state to determine an in-focus position of the focusing lens group when detecting a focus state in each of a plurality of focus detection areas while performing the search operation, and moving the focusing lens group firstly to one of the near extremity and the far extremity which is closer to a current position of the focusing lens group and subsequently toward the other thereof, and stopping the focusing lens group upon first detecting an in-focus state to determine an in-focus position of the focusing lens group when detecting a focus state in the single focus detection area while performing the search operation.

6 Claims, 13 Drawing Sheets

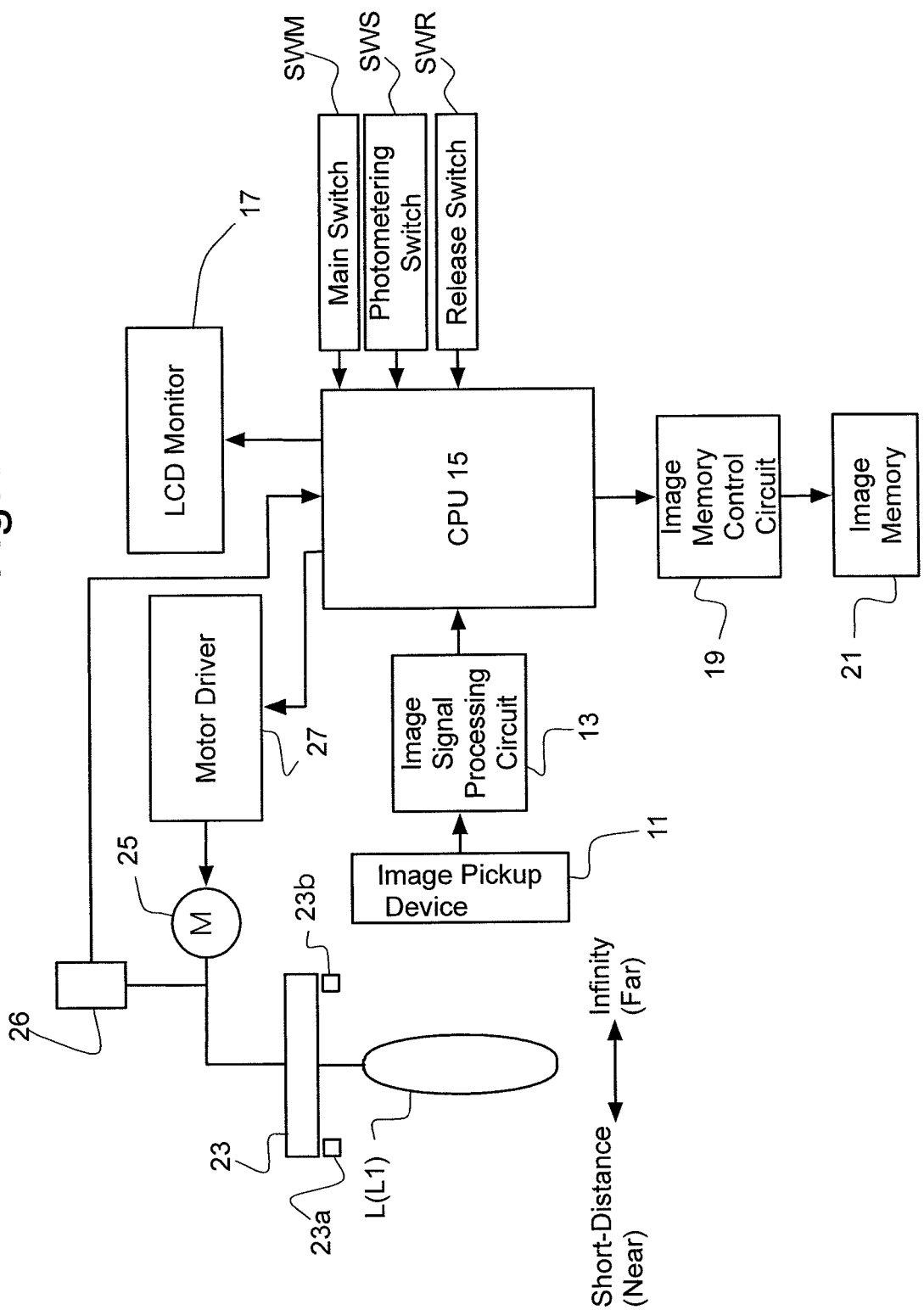

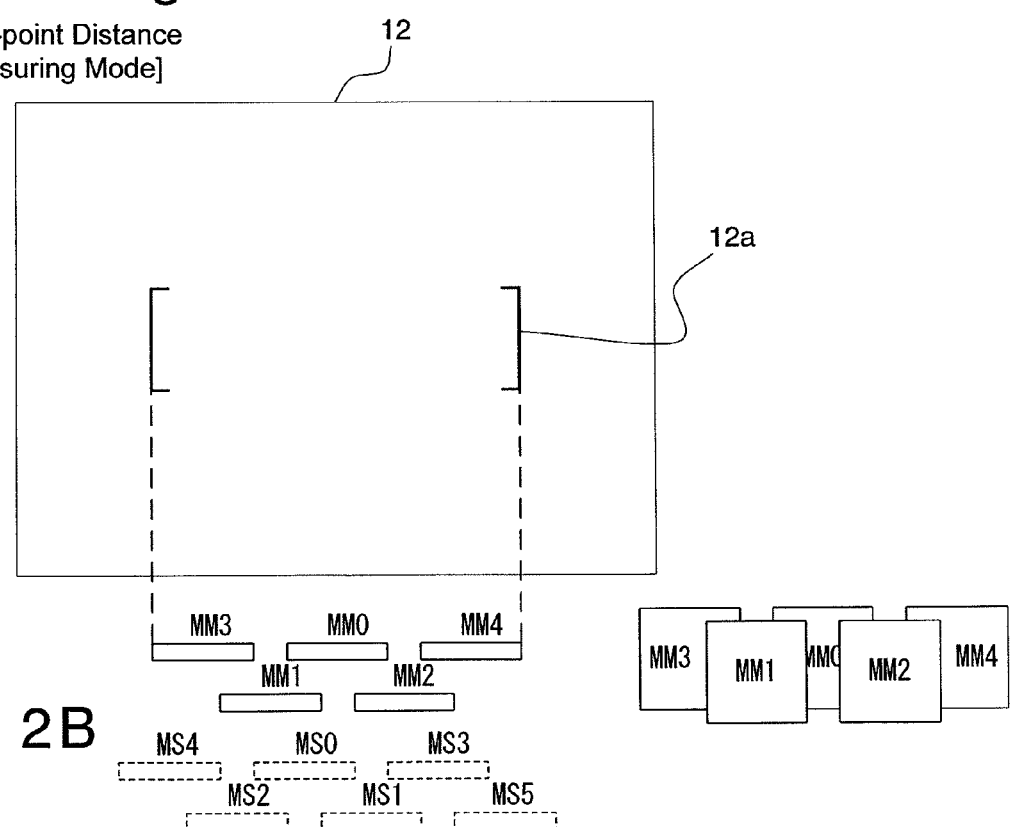

[Spot Distance Measuring Mode]
Fig. 3A
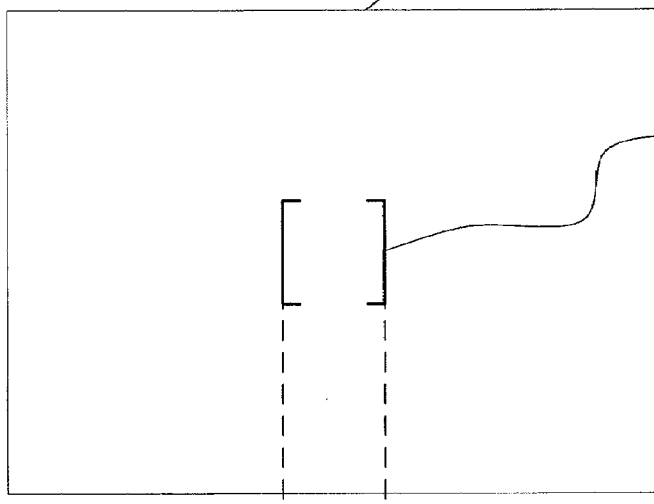
Fig. 3B
Fig. 4
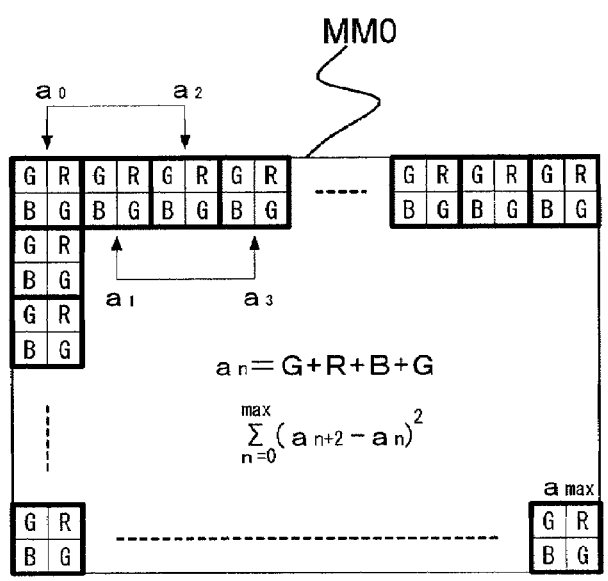
$$a_n = G+R+B+G$$
$$\sum_{n=0}^{max}(a_{n+2}-a_n)^2$$

[Multi-Point Distance Measuring Mode]

[Spot Distance Measuring Mode]

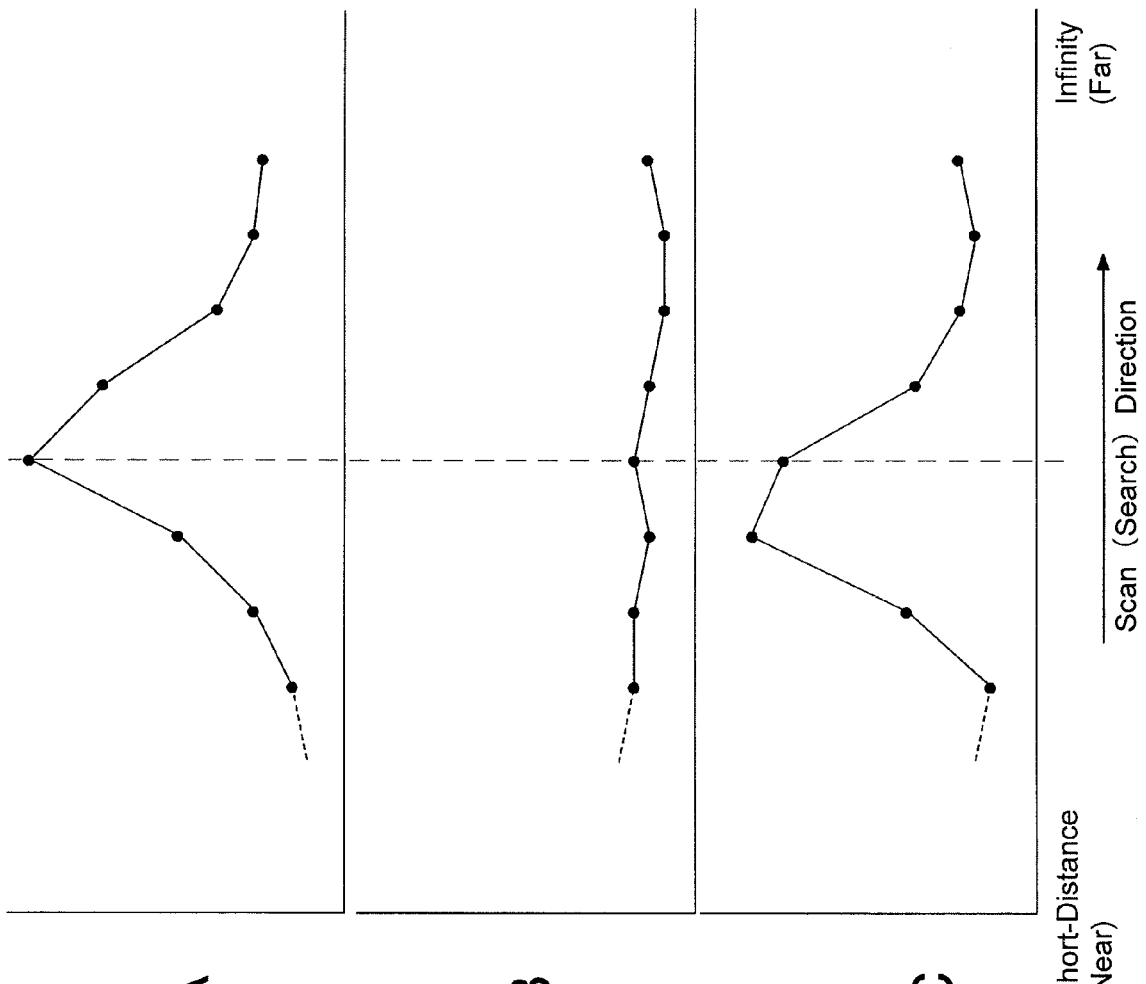

FOCUS DETECTION METHOD AND FOCUS DETECTION DEVICE

BACKGROUND OF THE INVENTION

1. Field of the Invention

The present invention relates to a focus detection method and a focus detection device for detecting a focus state from contrast of a captured image.

2. Description of the Prior Art

A conventional digital camera with a contrast-detection type focus detection system which detects a focus state by performing a search operation in which a focusing lens group is moved from the infinite focus position (far extremity/position for bringing an object at infinity into focus) to the closest (shortest) focus position (near extremity/position for bringing an object at the shortest distance in working range into focus), or vice versa, is known in the art, wherein the search operation is terminated upon a peak contrast occurring during the search operation on the supposition that this position of the focusing lens group at which the peak contrast is obtained is an in-focus position. Furthermore, an invention is disclosed in Japanese Unexamined Patent Publication 2002-311325, wherein the search operation is terminated upon a plurality of peak contrasts being detected simultaneously at a plurality of focus detection areas, respectively, when the search operation is performed from the infinite focus position toward the closest focus position, and the search operation is terminated upon a peak contrast being detected at even one of the plurality of focus detection areas when the search operation is performed from the closest focus position toward the infinite focus position. Additionally, another invention is disclosed in Japanese Unexamined Patent Publication 2002-072074, wherein the search operation starts from the infinite focus position when the focusing lens group is positioned closer to the infinite focus position than the closest focus position, and starts from the closest focus position when the focusing lens group is positioned closer to the closest focus position than the infinite focus position, in order to reduce the time for the search operation.

However, in conventional focus detection systems, even if the search operation is terminated upon a plurality of peak contrasts being respectively detected at a plurality of detection areas at the same time when the search operation is performed from the infinite focus position toward the closest focus position, there is a possibility of an object existing at closer range. If a plurality of peak contrasts simultaneously occur at all the plurality of detection areas, respectively, there is a high possibility that the object is at the closest focus position (shortest object distance). However, it is rare that a plurality of peak contrasts simultaneously occur at all the plurality of detection areas because in the related art a search operation is performed from the infinite focus position toward the closest focus position and the search operation stops as soon as a peak contrast is detected, and accordingly, the object at the closest focus position cannot be brought into focus.

SUMMARY OF THE INVENTION

The present invention provides a focus detection method which makes it possible to bring an object at the closest focus position into focus with reliability when detecting focus in a plurality of detection areas or a wide detection area, and which further makes it possible to reduce the time required to bring an object into focus when detecting focus in a single detection area or a narrow detection area. The present invention further provides a focus detection device which operates according to such a focus detection method.

According to an aspect of the present invention, a focus detection method is provided for detecting a focus state based on an object image formed through a photographing optical system in one of a single focus detection area and a plurality of focus detection areas while performing a search operation in which a focusing lens group of the photographing optical system is moved from one toward the other of a near extremity and a far extremity, the focus detection method including moving the focusing lens group from the near extremity toward the far extremity in the search operation, and stopping the focusing lens group upon first detecting an in-focus state to determine an in-focus position of the focusing lens group when detecting a focus state in each of the plurality of focus detection areas while performing the search operation, and moving the focusing lens group firstly to one of the near extremity and the far extremity which is closer to a current position of the focusing lens group and subsequently toward the other of the near extremity and the far extremity in the search operation, and stopping the focusing lens group upon first detecting an in-focus state to determine an in-focus position of the focusing lens group when detecting a focus state in the single focus detection area while performing the search operation.

It is desirable for the focus detection method to be based on a contrast AF system which detects contrasts of an image while moving the focusing lens group stepwise and determines a position of the focusing lens group at which a peak contrast is obtained to be an in-focus position of the focusing lens group.

The focus detection method can include moving the focusing lens group to the in-focus position upon determining the position of the focusing lens group, at which the in-focus state is detected, to be the in-focus position of the focusing lens group.

It is desirable for one of the plurality of focus detection areas to serve as the single focus detection area.

It is desirable for the focusing lens group to be moved stepwise by a stepping motor.

In an embodiment, a focus detection device is provided, including an image pickup device which converts an object image that is formed via a photographing optical system into electrical image data; a lens driving device which moves a focusing lens group of the photographing optical system; and a controller for detecting a focus state based on image data, converted by the image pickup device, in one of a single focus detection area and a plurality of focus detection areas while performing a search operation in which the focusing lens group of the photographing optical system is moved from one of a near extremity and a far extremity toward the other via the lens driving device. The controller moves the focusing lens group from the near extremity toward the far extremity in the search operation, and stops the focusing lens group upon first detecting an in-focus state to determine a position of the focusing lens group at which the in-focus state is detected to be an in-focus position of the focusing lens group when detecting a focus state in each of the plurality of focus detection areas while performing the search operation. The controller moves the focusing lens group firstly to one of the near extremity and the far extremity which is closer to a current position of the focusing lens group and subsequently toward the other of the near extremity and the far extremity in the search operation, and stops the focusing lens group upon first detecting an in-focus state to determine a position of the focusing lens group at which the in-focus state is detected to be an in-focus position of the focusing lens group when detecting a focus state in the single focus detection area while performing the search operation.

According to the present invention, the search operation starts from the shortest object distance when a focus state is detected in a multi-point distance measuring mode, which makes it possible to bring an object at the closest focus position into focus with reliability, while the time required to bring an object at the closest focus position into focus when a focus state is detected in a spot distance measuring mode is reduced.

The present disclosure relates to subject matter contained in Japanese Patent Application No. 2006-155908 (filed on Jun. 5, 2006), which is expressly incorporated herein in its entirety.

BRIEF DESCRIPTION OF THE DRAWINGS

The present invention will be discussed below in detail with reference to the accompanying drawings, in which:

FIG. 1 is a block diagram of elements of an embodiment of a digital camera to which a focus detecting method according to the present invention is applied, showing a basic configuration of the digital camera;

FIGS. 2A and 2B are diagrammatic sketches showing the relationship between the light receiving surface of an image pickup device and a plurality of focus detection areas on the light receiving surface in the digital camera in a multi-point distance measuring mode, wherein FIG. 2A shows a focus frame in which the plurality of detection areas are distributed and FIG. 2B shows the relationship between the plurality of focus detection areas and an associated plurality of support areas;

FIGS. 3A and 3B are diagrammatic sketches showing the relationship between the light receiving surface of the image pickup device and a single focus detection area on the light receiving surface in the digital camera in a spot distance measuring mode, wherein FIG. 3A shows a focus frame in which the single focus detection area is positioned and FIG. 3B shows the relationship between the single focus detection area and associated support areas;

FIG. 4 is a diagrammatic illustration showing the arrangement of primary-color filters of the image pickup device;

FIGS. 12A and 12B are graphs showing movements of the focusing lens group in the multi-point distance measuring mode, wherein FIG. 12A shows an example when the focusing lens group is positioned in the vicinity of the infinite focus position and FIG. 12B shows an example when the focusing lens group is positioned in the vicinity of the closest focus position;

FIGS. 13A and 13B are graphs showing movements of the focusing lens group in the spot distance measuring mode, wherein FIG. 13A shows an example when the focusing lens group is positioned in the vicinity of the infinite focus position and FIG. 13B shows an example when the focusing lens group is positioned in the vicinity of the closest focus position;

FIGS. 15A, 15B and 15C are graphs showing examples of contrast values obtained by the search operation in the contrast AF process.

DESCRIPTION OF THE PREFERRED EMBODIMENT

Figure 5:
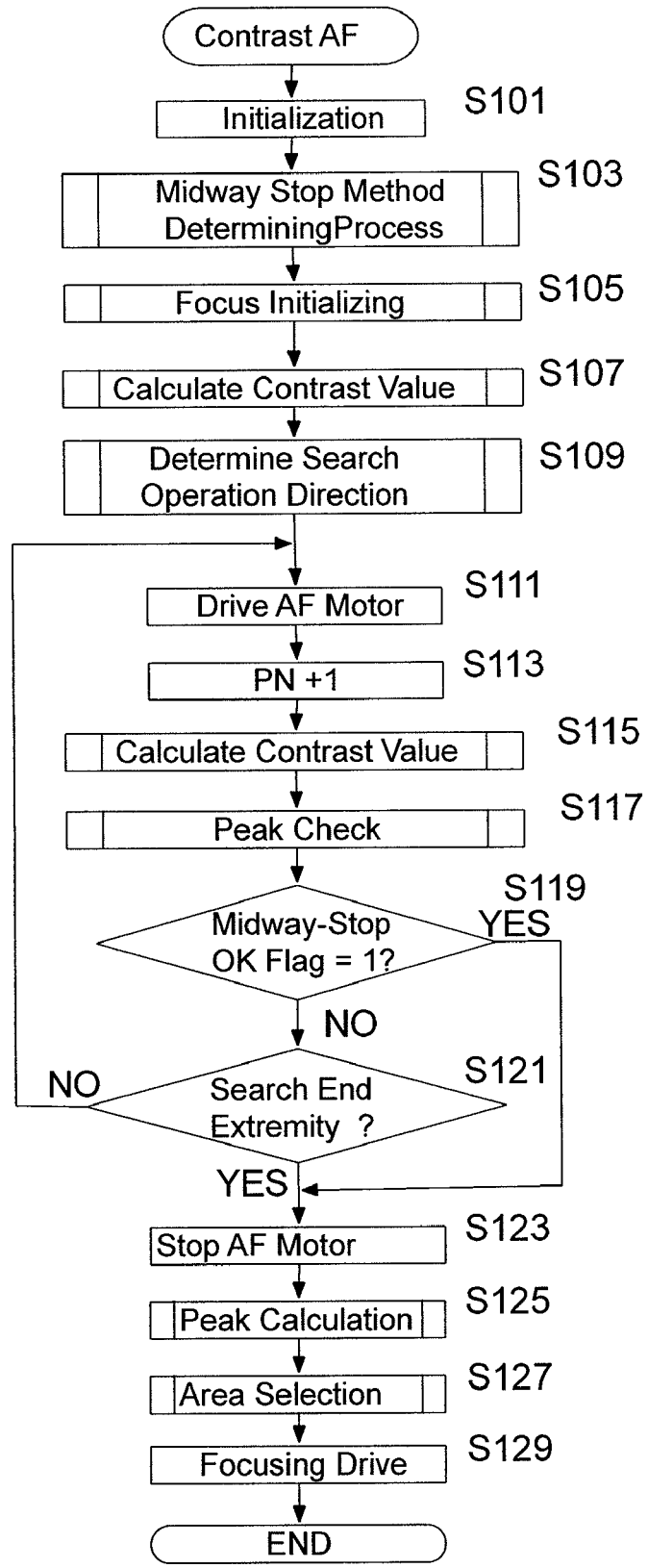
FIG. 5 is a flow chart showing a contrast AF process to which an embodiment of the focus detecting method according to the present invention is applied.

FIG. 1 is a block diagram of essential elements of an embodiment of a digital camera having a contrast-detection type of multi-point distance measuring to which the present invention is applied.

This digital camera is provided with a photographing lens L including a focusing lens group L1, and an image pickup device (CCD image sensor) 11 serving as an imaging device. An object image is formed on a light receiving surface 12 (see FIG. 2) of the image pickup device 11 via the photographing lens L. The image pickup device 11 includes a large number of pixels (photoelectric transducing elements) arranged in a two-dimensional matrix at predetermined intervals. The digital camera is further provided with an image signal processing circuit 13, an LCD monitor 17, an image memory control circuit 19, and an image memory 21. Each pixel of the image pickup device 11 converts the incident light of an object image thereon into an electrical charge, and the electrical charges are accumulated (integrated). Upon completion of an exposure, the accumulated charges are output, pixel by pixel, as an image signal to the image signal processing circuit 13. The image signal processing circuit 13 performs predetermined adjusting processes such as a white-balance adjusting process and an A/D converting process on the input image signal to output digital image data to a CPU 15. Namely, image data to which a predetermined process has been given and converted into digital image data in units of pixels are output to the CPU 15. The CPU 15 converts the input image data into an image signal capable of being indicated on the LCD monitor 17 to visually indicate the image data on the LCD monitor 17 in a through mode (monitoring mode), captures the image within the selected detection area or areas when the contrast AF process is performed, and converts the input image data into image data having a predetermined format to write this image data into the image memory 21 via the image memory control circuit 19 in an image recording mode.

FIGS. 2A and 2B show the relationship between five focus detection areas MM0, MM1, MM2, MM3 and MM4 and six support areas MS0, MS1, MS2, MS3, MS4 and MS5 which support these five focus detection areas as an example of the light receiving surface (imaging surface) 12 of the image pickup device 11 provided with a plurality of focus detection areas for multi-point distance measurement. FIG. 2A shows a focus frame (AF frame) 12a which includes the five focus detection areas MM0, MM1, MM2, MM3 and MM4 and the six support areas MS0, MS1, MS2, MS3, MS4 and MS5, and FIG. 2B schematically shows a state of overlapping among the five focus detection areas MM0, MM1, MM2, MM3 and MM4 and the six support areas MS0, MS1, MS2, MS3, MS4 and MS5.

In the present embodiment of the digital camera, the focus detection area MM1 overlaps each of the two focus detection areas MM0 and MM3 adjacent to the focus detection area MM1, and the focus detection area MM2 overlaps each of the two focus detection areas MM0 and MM4 adjacent to the focus detection area MM2.

Additionally, the two support areas MS0 and MS1 overlap the focus detection area MM0 from the laterally opposite sides thereof, respectively, while overlapping each other; the two support areas MS0 and MS2 overlap the focus detection area MM1 from the laterally opposite sides thereof, respectively, while overlapping each other; the two support areas MS1 and MS3 overlap the focus detection area MM2 from the laterally opposite sides thereof, respectively, while overlapping each other; the two support areas MS2 and MS4 overlap the focus detection area MM3 from the laterally opposite sides thereof, respectively, while overlapping each other; and the two support areas MS3 and MS5 overlap the focus detection area MM4 from the laterally opposite sides thereof, respectively, while overlapping each other.

The overlapping and supplemental relationship between the five focus detection areas MM0, MM1, MM2, MM3 and MM4 and the six support areas MS0, MS1, MS2, MS3, MS4 and MS5 is as follows.

The focus detection area MM0 is supported by the two support areas MS0 and MS1, the focus detection area MM1 is supported by the two support areas MS0 and MS2, the focus detection area MM2 is supported by the two support areas MS1 and MS3, the focus detection area MM3 is supported by the two support areas MS2 and MS4, and the focus detection area MM4 is supported by the two support areas MS3 and MS5.

The focus detection area MM0 and the two support areas MS0 and MS1 are used as a group of focus detection areas for detecting a focus state, the focus detection area MM1 and the two support areas MS0 and MS2 are used as a group of focus detection areas for detecting a focus state, the focus detection area MM2 and the two support areas MS1 and MS3 are used as a group of focus detection areas for detecting a focus state, the focus detection area MM3 and the two support areas MS2 and MS4 are used as a group of focus detection areas for detecting a focus state, and the focus detection area MM4 and the two support areas MS3 and MS5 are used as a group of focus detection areas for detecting a focus state.

FIG. 3 shows the relationship between a focus detection area SM0 and two support areas SS0 and SS1 which support the focus detection area SM0 as an example of the light receiving surface (imaging surface) 12 of the image pickup device 11 provided with a single focus detection area for spot distance measurement. FIG. 3A shows a focus frame (AF frame) 12b which includes the focus detection area SM0 and the two support areas SS0 and SS1, and FIG. 3B schematically shows a state of overlapping among the focus detection area SM0 and the two support areas SS0 and SS1.

In the present embodiment of the digital camera, each support area (MS0 through MS5 and SS0 and SS1) is used to improve the accuracy of the associated overlapping focus detection area, i.e., to improve the accuracy in detection of contrast of the object image included in the overlapping portion, and is not used to make a selection of focus detection areas MM0 through MM4. In addition, in the present embodiment of the digital camera, the focus frame 12b used for the spot distance measurement than the focus frame 21a used in the multi-point distance measurement.

Although not shown in detail in the drawings, primary-color filters (red (R), green (G) and blue (B) filters) are disposed in front of each pixel (photoelectric transducing element) on the object side thereof, and each pixel on the light receiving surface 12 transduces the red, green and blue components of the incident rays of object light that are passed through the primary-color filters into electrical charges, and these electrical charges are accumulated. The electrical charges thus accumulated for a predetermined period of time are read out of the image pickup device 11 pixel by pixel to be output as an image signal.

FIG. 4 shows the pattern of the primary-color filters included in the focus detection area MM0 in the light receiving surface 12. In the illustrated embodiment of the digital camera, a typical arrangement (Bayer array) of primary-color filters is adopted. The primary-color filters include GR (green and red) lines, each of which includes two kinds of filters (filters G and R), alternately arranged in the horizontal direction, and BG (blue and green) lines, each of which includes two kinds of filters (filters B and G), alternately arranged in the horizontal direction. The GR lines and the BG lines are alternately arranged in the vertical direction. In the illustrated embodiment of the digital camera, four pixels (a 2 by 2 matrix of pixels) in each square, namely, a combination of two green filters (two filters G), a red filter (filter R) and a blue filter (filter B) is treated as one pixel block, and the sum of the magnitudes of image signals integrated by the four pixels in each pixel block is regarded as intensity $a_n$ ($a_n$=G+R+B+G).

Accordingly, an operation for determining the difference between the intensity $a_n$ of a pixel block and the intensity $a_n$ of another pixel block positioned one pixel-block away from the previous pixel block in the horizontal direction is repeated successively in the horizontally rightward direction within the focus detection area MM0 while the differences thus determined ($a_{n+2}$-$a_n$) are added up. Upon completion of these difference determining and adding operations on the pixel block at the right end of the focus detection area MM0 in the horizontal direction, the difference determining and adding operations are repeated on a subsequent row of pixel blocks one pixel block below the previous row of pixel blocks in the vertical direction until completion of the determining operation on the pixel block at the right end of the focus detection area MM0 in the horizontal direction and completion of the adding operation thereof. Such difference determining and adding operations are repeated up to the right end of the focus detection area MM0 in the bottom row thereof.

The sum of the differences ($a_{n+2}$-$a_n$) on the focus detection area MM0 corresponds to the contrast value on the focus detection area MM0 at the current position of the focusing lens group L1. The contrast value can be represented by the following expression 1:

$$\sum_{n=0}^{max} (a_{n+2} - a_n)^2 \qquad \text{[Expression 1]}$$

Each of the remaining four focus detection areas MM1 through MM4, the focus detection area SM0, the six support areas MS0 through MS5 and the two support areas SS0 and SS1 has an identical structure and control method to the focus detection area MM0.

In the contrast AF mode in the present embodiment of the digital camera, a combination of a CCD high-speed drive mode and a small pixel-count addition mode, and a combination of a CCD low-speed drive mode and an large pixel-count addition mode (VGA) are switched according to the brightness of an object to be photographed.

The above described control of the image pickup device is carried out in the small pixel-count addition mode in the case where the image pickup device 11 operates in the CCD high-speed drive mode (in which the exposure time of the image pickup device 11 is short) when the brightness of the object is high.

In the case of a low-brightness object, the image pickup device 11 operates in the CCD low-speed drive mode (in which the exposure time of the image pickup device is long) and in the large pixel-count addition mode, in which, e.g., the intensities of four pixel blocks (sixteen pixels in total) are added up or the intensities of four-by-four pixels (sixteen pixels in total) centered on each pixel block (consisting of two green filters, a red filter and a blue filter) are added up.

In the present embodiment of the compact digital camera, the CPU 15 performs an image capturing process on the image pickup device 11 while moving the focusing lens group L1 stepwise via the motor driver 27, the AF motor 25 and the lens drive mechanism 23 (which constitute a lens driving device); inputs the image signals from the preselected detection areas among the image signals of the captured image to determine the contrast values on the preselected detection areas, respectively; and stores the determined contrast values in an internal RAM of the CPU 15 as contrast data. The CPU 15 repeats the contrast AF process while moving the focusing lens group L1 stepwise in the direction from the closest focus position (one end of the range of movement of the focusing lens group L1) to the infinite focus position (the other end of the range of movement of the focusing lens group L1), or vice versa.

The position (lens position) of the focusing lens group L1 in the optical axis direction is detected using an origin sensor 23a and an origin sensor 23b with the closest focus position (near extremity) and the infinite focus position (far extremity) of the focusing lens group L1 being predetermined as two points of origin, respectively, and is counted as the number of drive pulses from either point of origin. The drive pulses are defined as, e.g., pulses output from an encoder 26 such as a photo-interrupter installed on the output shaft of the AF motor 25. Although several hundreds of pulses or more are usually necessary for driving the focusing lens group L1 from the closest focus position to the infinite focus position, it is assumed that several pulses or several dozen pulses are only necessary for driving the focusing lens group L1 (while capturing images) in a stepwise manner from the closest focus position to the infinite focus position in a contrast AF process (see FIG. 5) in the present embodiment of the digital camera for the purpose of simplifying the description, and that one step corresponds to one drive pulse and one position pulse.

In addition, in the present embodiment of the digital camera, in either of the two cases where a search operation (scanning operation) in which the focusing lens group L1 is moved from the closest focus position to the infinite focus position is performed and where a search operation in which the focusing lens group L1 is moved from the infinite focus position to the closest focus position is performed, the position pulse (lens position pulse) at the initial position of the focusing lens group L1 is 0, the position pulses are added up when the focusing lens group L1 is driven stepwise from the initial position thereof to another position, and a position pulse is subtracted from the position pulses thus added up step by step when the focusing lens group L1 is driven stepwise in the opposite direction toward the initial position thereof.

[Search Operation Midway Stop]

In the present embodiment of the digital camera, upon a peak contrast occurring during the search operation in the contrast AF process, the search operation is terminated under predetermined conditions to thereby make it possible to reduce the time for focus adjustment with no focusing error.

[In the Case of Bright Object]

The present embodiment of the digital camera operates in the CCD high-speed drive mode, the small pixel-count addition mode, and a single-peak-occurrence stop mode (the details thereof will be discussed in later) in the contrast AF mode when the brightness of the object is high.

In the case of detecting a contrast when the brightness of the object is high in the small pixel-count addition mode, the exposure time of the image pickup device 11 is short and the sum of pixel additions is smaller than in the case detecting a contrast when the brightness of the object is low in the large pixel-count addition mode, so that there is a little possibility of contrasts outside of the selected detection area being picked up on one occasion and not picked up on another occasion. Accordingly, the search operation is terminated (during the progress thereof) upon a peak contrast occurring in any of the five focus detection areas MM0 through MM4 in the multi-point distance measuring mode, and the search operation is terminated upon a peak contrast occurring in the focus detection area SM0 in the spot distance measuring mode.

Due to this operation terminating the search operation during the progress thereof, a further reduction in time required for focus adjustment can be achieved.

[In the Case of Dark Object]

The present embodiment of the digital camera operates in the CCD low-speed drive mode, the large pixel-count addition mode, and a multi-peak-occurrence stop mode (the details thereof will be discussed in later) in the contrast AF mode when the brightness of the object is low.

In the case of detecting a contrast when the brightness of the object is low in the large pixel-count addition mode, the exposure time of the image pickup device 11 is long, so that it is often the case that contrasts outside of the selected detection area are picked up on one occasion and not picked up on another occasion due to hand shake (camera shake), or the like, during the search operation. Moreover, the number of pixel values increases due to the large pixel-count addition mode (VGA), and accordingly, it is often the case that contrasts outside of the selected detection area are picked up on one occasion and not picked up on another occasion and there is a high possibility of a false peak contrast occurring. To prevent this from occurring, in the present embodiment of the digital camera, the search operation is terminated immediately after a peak contrast occurs in any of the five focus detection areas MM0 through MM4 and a peak contrast occurs in either of the associated two support areas (MS0 and MS1, MS0 and MS2, MS1 and MS3, MS2 and MS4, or MS3 and MS5) at the same time in the multi-point distance measuring mode, while the search operation is terminated immediately after a peak contrast occurs in the focus detection area SM0 and a peak contrast occurs in either of the two support areas SS0 and SS1 at the same time in the spot distance measuring mode.

The chances of a false peak contrast being detected are remote and the possibility that a focusing error may occur is low if the search operation is terminated at such a moment rather than terminated upon a peak contrast occurring in one of the five focus detection areas MM0 through MM4 in the multi-point distance measuring mode.

The occurrence of a peak contrast in each support area can be within the range of two or three successive pulse positions. In this case, it can be set to select a focus detection area, the closest focus position or some midway point between the closest focus position and the infinite focus position.

[Direction of the Search Operation]

Figure 12A:
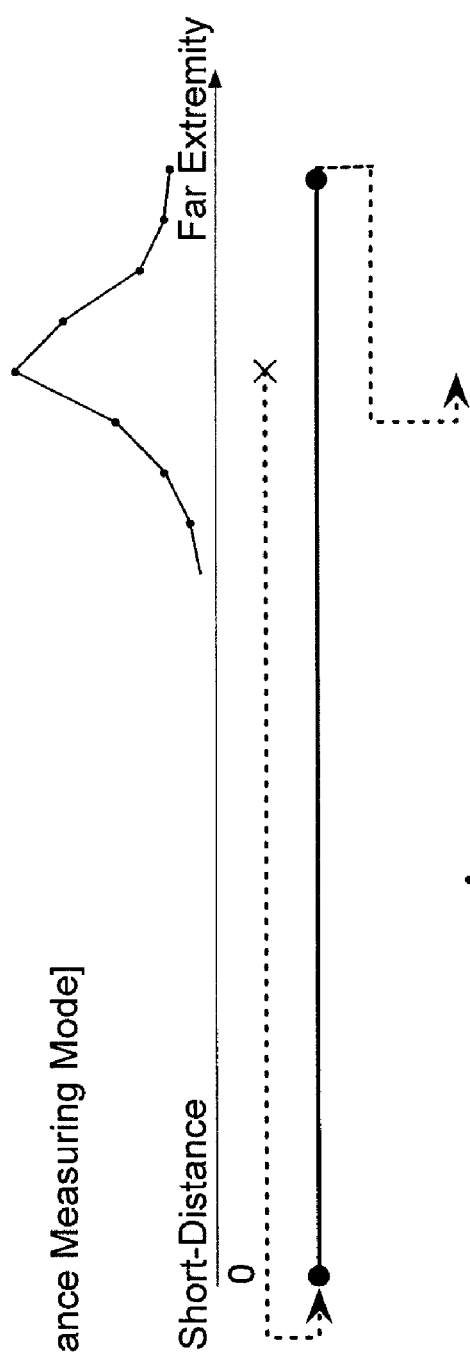
Figure 12B:
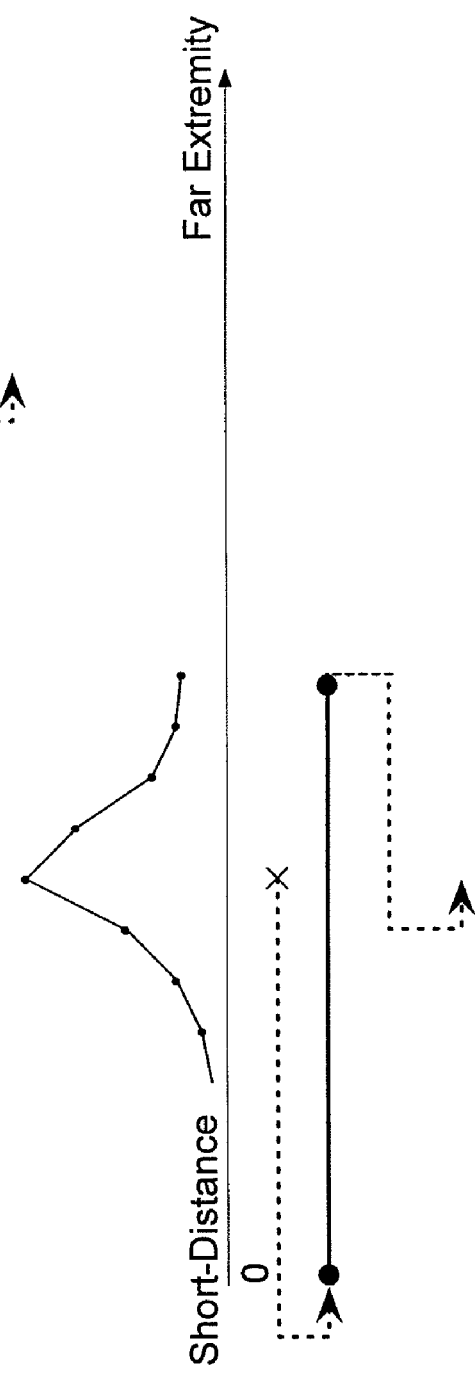
Figure 13A:
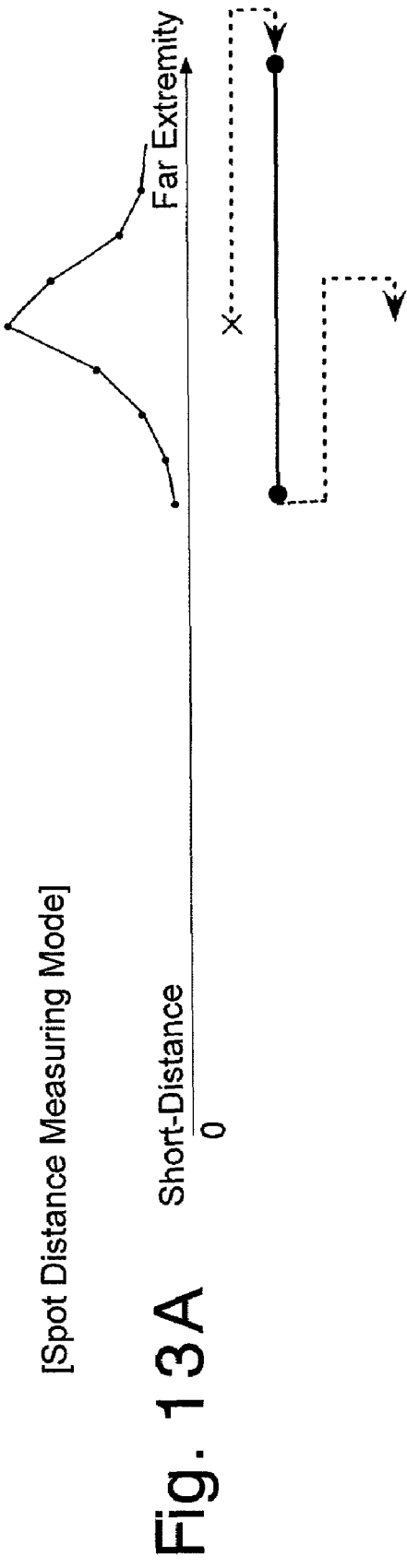
Figure 13B:
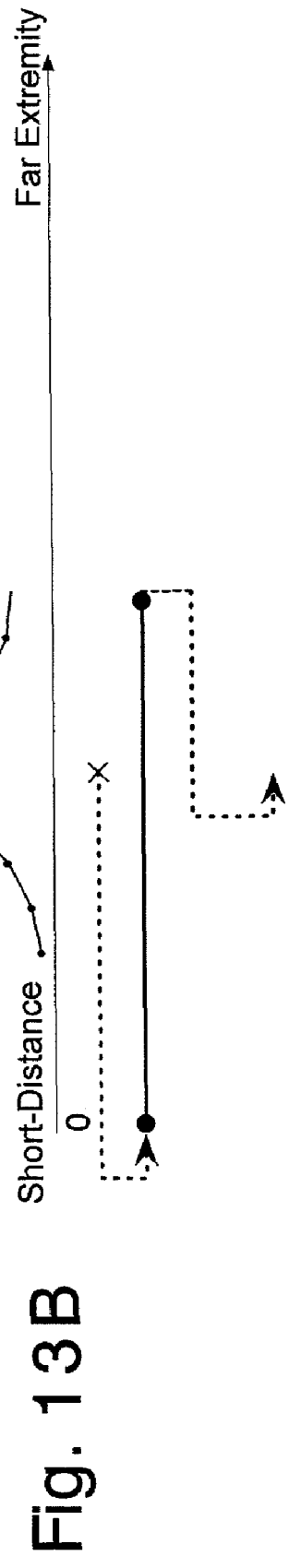

In the case where the focus detection area is large or many focus detection areas are distributed in a wide range though one focus detection area is small, i.e., in the case of the multi-point distance measurement, the direction of the search operation (the direction of movement of the focusing lens group L1 in the search operation) is limited to the direction from the closest focus position toward the infinite focus position regardless of the current stop position of the focusing lens group L1 (see FIGS. 12A and 12B). In the case where the focus detection area is small, e.g., in the case of a spot distance measurement, the direction of the search operation is set to either the direction from the infinite focus position toward the closest focus position (see FIG. 13A) or the direction from the closest focus position toward the infinite focus position (see FIG. 13B) depending on the current stop position of the focusing lens group L1.

[In the Case of Multi-Point Distance Measurement]

In the case of the multi-point distance measuring mode that uses the large focus frame 12a, the direction of the search operation is limited to the direction from the closest focus position toward the infinite focus position. Since it is sometimes the case that images of near and far objects are included in the plurality of focus detection areas, the near object is given priority in being brought into focus by limiting the direction of the search operation to the direction from the closest focus position toward the infinite focus position.

[In the Case of Spot Distance Measurement]

In the case of the spot distance measuring mode that uses the small focus frame 12b, the direction of the search operation is allowed to be either direction, i.e., from the infinite focus position to the closest focus position, or vice versa. In the spot distance measurement, the chances of images of near and far objects being included in the focus detection area are remote, and accordingly, the time for focus adjustment can be reduced by terminating the search operation upon a peak contrast occurring after the commencement of the search operation.

Operations of the contrast AF process performed in the present embodiment of the digital camera will be discussed with reference to the flow charts shown in FIGS. 5 through 11. The contrast AF in this particular embodiment of the digital camera is a so-called one-shot AF, in which control enters the flow chart shown in FIG. 5 upon the photometering switch SWS being turned ON and stops upon an object being brought into focus.

In the contrast AF process, firstly various variables, etc., are initialized (step S101). For instance, each status (flag) is cleared (i.e., set to 0), contrast values are cleared, a lens-position pulse number PN is initialized (PN=0), the maximum contrast value is set to 0, the minimum contrast value is set to FFFFFFFF, a midway-stop identification flag is cleared, a midway-stop OK flag is cleared, and the number of detection areas is set according to the focal length.

Variables and others are defined as follows.

Contrast values are those actually obtained at each focus detection area or support area.

Given that the lens-position pulse number PN is 0 when the focusing lens group L1 is positioned at one of the closest focus position and the infinite focus position which serves as the initial position of the focusing lens group L1, the lens-position pulse number PN is a variable which is incremented by one every time the encoder 26 outputs one pulse (drive pulse) when the AF motor 25 is driven in the direction toward the other of the closest focus position and the infinite focus position. Accordingly, when the AF motor 25 is driven to move the focusing lens group L1 in the direction toward the initial position thereof, the lens-position pulse number PN is decremented by one every time the encoder 26 outputs one pulse (drive pulse).

The maximum contrast value and the minimum contrast value are variables to which actually-obtained maximum and minimum contrast values are assigned, respectively.

The midway-stop identification flag (PerhapsOK flag) is a flag for identification of a midway stop of the search operation. Specifically, the midway-stop identification flag "0" and "1" indicate that the search operation without and with a midway stop, respectively.

The midway-stop OK flag (StopOK flag) is a flag which enables or disables the search operation. Specifically, the midway-stop OK flags "0" and "1" disable and enable the search operation, respectively.

A midway-stop check flag (StopCheck flag) is a flag which indicates whether or not to check conditions of the midway stop of the search operation. Specifically, the midway-stop check flags "0" and "1" indicate not to check and to check conditions of the midway stop of the search operation, respectively.

After the completion of the above described initializing process at step S101, a midway stop method determining process is performed (step S103). Namely, it is determined whether the search operation is terminated upon at least two peak contrasts occurring simultaneously in at least two areas (one focus detection area and at least one associated support area), respectively, or the search operation is terminated upon a peak contrast occurring in any of the five focus detection areas.

A condition for determining the way to stop the search operation can be either the object brightness or a CCD drive mode of the image pickup device (CCD image sensor) 11 that operates in association with object brightness.

Subsequently, a focus initializing process (see FIG. 7) is performed (step S105). In this focus initializing process, the focusing lens group L1 is moved to the initial position thereof in accordance with the current focus position (current lens position) and the selected focus detection area or areas. Specifically, in the present embodiment of the digital camera, the focusing lens group L1 is moved to one of the opposite ends of the range of movement thereof (the closest focus position or the infinite focus position) which is closer to the current position of the focusing lens group L1 when the digital camera is in the spot distance measuring mode, or the focusing lens group L1 is moved to the closest focus position regardless of the current position of the focusing lens group L1 when the digital camera is in the multi-point distance measuring mode.

Thereafter, a contrast value calculating process at the initial stop position (current position) of the focusing lens group L1 is performed (step S107). Namely, based on the image data input from the image pickup device 11, the contrast value P[0] at the initial position of the focusing lens group L1 is calculated, and the maximum contrast value Max and the minimum contrast value Min are updated.

Subsequently, the direction of the search operation is determined (step S109). In the case where the focusing lens group L1 is moved to the closest focus position by the focus initializing process at step S105, the direction of the search operation is determined as the direction toward the infinite focus position at step S109. In the case where the focusing lens group L1 is moved to the infinite focus position by the focus initializing process at step S105, the direction of the search operation is determined as the direction toward the closest focus position at step S109.

Thereafter, the AF motor 25 is driven by one step in the direction of the search operation determined at step S109 (step S111). Subsequently, the lens-position pulse number PN is increased by one (step S113). Subsequently, a contrast value P[PN] is calculated in accordance with image data input from the image pickup device 11, and the maximum contrast value and the minimum contrast value are updated (step S115).

Subsequently, a peak check process (see FIG. 8) is performed which determines whether or not the contrast value P[PN] calculated at step S115 is a peak contrast value which satisfies preset conditions (step S117).

The contrast value calculating process at step S115 and the peak check process at step S117 are performed on all the focus detection areas selected at step S101.

Subsequently, it is determined whether or not the midway-stop OK flag is "1" (step S119). If the midway-stop OK flag is not "1" (if NO at step S119), it is determined whether or not the focusing lens group L1 has reached the search end extremity thereof (step S121). If the focusing lens group L1 has not reached the search end extremity thereof (if NO at step S121), control returns to step S111 so that the above described operations at steps S111 through S119 are repeated.

The operations at steps S111 through S121 are repeated while the focusing lens group L1 is moved stepwise toward the search end extremity in units of drive pulses (if NO at step S121).

If the focusing lens group L1 has reached the search end extremity thereof (if YES at step S121) or if the midway-stop OK flag is "1" (if YES at step S119), the AF motor 25 is stopped (step S123). Subsequently, a peak calculation process for calculating a peak contrast value (by linear approximation) is performed in accordance with the five contrast values at consecutive five lens positions which are obtained in the loop process at steps S111 through S121 (step S125). Namely, an estimated more precise peak contrast value and the position thereof are calculated by linear approximation because there is a possibility of a real peak contrast value existing in the vicinity of a peak contrast value among the contrast values respectively calculated at the stepping positions.

Subsequently, an area selection process is performed at step S127. In the area selection process, one of the focus detection areas in which a value at the closest distance is obtained in accordance with the peak contrast value obtained at each focus detection area is selected as an in-focus area in the multi-point distance measuring mode (step S127), and the focusing lens group L1 is moved to the lens position thereof at which a peak contrast value is obtained in this in-focus area (step S129). Thereafter, contrast AF process is ended.

[Determination of Midway Stop Method]

Figure 6:
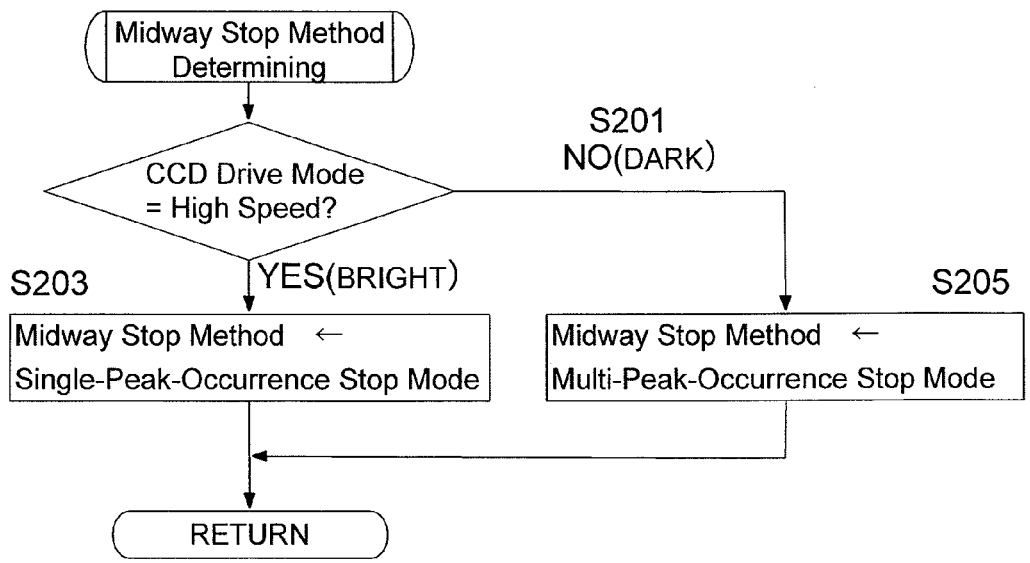
FIG. 6 is a flow chart showing a sub-routine "midway stop method determining process" performed in the contrast AF process shown in FIG. 5.

The midway stop method determining process that is performed at step S103 will be hereinafter discussed in detail with reference to the flow chart shown in FIG. 6.

In the midway stop method determining process, it is determined whether or not the CCD drive mode is the CCD high-speed drive mode (step S201). The image pickup device 11 operates in the CCD high-speed drive mode (short-time exposure mode) when object brightness is equal to or higher than a predetermined value, or operates in the CCD low-speed drive mode (long-time exposure mode) when object brightness is lower than the predetermined value.

In the case of the CCD high-speed drive mode (if YES at step S201), the single-peak-occurrence stop mode is set (at step S203) and control returns. In the case of the CCD low-speed drive mode (if NO at step S201), the multi-peak-occurrence stop mode is set (at step S205) and control returns.

In the single-peak-occurrence stop mode, the search operation is terminated upon a peak contrast occurring in any of the five focus detection areas MM0 through MM4 in the case of the multi-point distance measuring mode, or the search operation is terminated upon a peak contrast occurring in the focus detection area SM0 in the case of the spot distance measuring mode.

In the multi-peak-occurrence stop mode, the search operation is terminated immediately after a peak contrast occurs in any of the five focus detection areas MM0 through MM4 and a peak contrast occurs in either of the associated two support areas (MS0 and MS1, MS0 and MS2, MS1 and MS3, MS2 and MS4, or MS3 and MS5) at the same time in the case of the multi-point distance measuring mode, or the search operation is terminated immediately after a peak contrast occurs in the focus detection area SM0 and a peak contrast occurs in either of the two support areas SS0 and SS1 at the same time in the case of the spot distance measuring mode.

[Focus Initializing Process]

Figure 7:
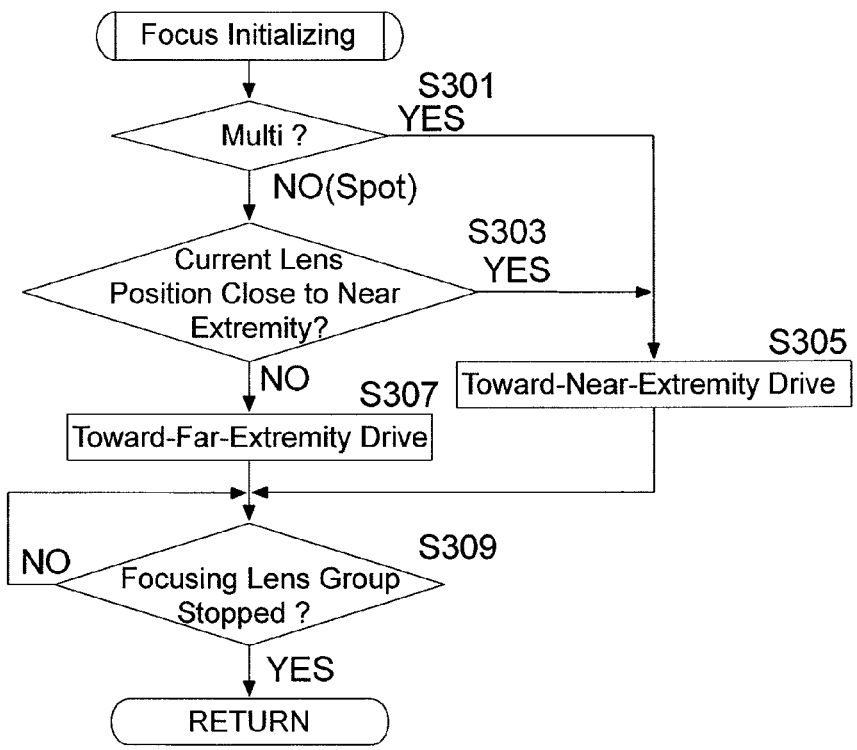
FIG. 7 is a flow chart showing a sub-routine "focus initializing process" performed in the contrast AF process shown in FIG. 5.

The focus initializing process that is performed at step S105 in the contrast AF process will be discussed in detail with reference to the flow chart shown in FIG. 7.

In the focus initializing process, firstly it is determined whether or not the currently-set distance measuring mode is the multi-point distance measuring mode (step S301). If the currently-set distance measuring mode is the multi-point distance measuring mode (if YES at step S301), a toward-near-extremity drive process is performed (step S305). In the toward-near-extremity drive process, the AF motor 25 is driven to move the focusing lens group L1 toward the closest focus position (near extremity). If the currently-set distance measuring mode is not the multi-point distance measuring mode (if NO at step S301), it is determined whether or not the current position of the focusing lens group L1 is in the vicinity of the closest focus position (step S303). If the current position of the focusing lens group L1 is in the vicinity of the closest focus position (if YES at step S303), the toward-near-extremity drive process is performed (step S305) and control proceeds to step S309. If the current position of the focusing lens group L1 is not in the vicinity of the closest focus position (if NO at step S303), a toward-far-extremity drive process is performed (step S307). In the toward-far-extremity drive process, the AF motor 25 is driven to move the focusing lens group L1 toward the infinite focus position (far extremity).

Thereafter, whether or not the focusing lens group L1 has reached the closest focus position, or the infinite focus position, is repeatedly checked until the focusing lens group L1 reaches the closest focus position or the infinite focus position (step S309). Upon the focusing lens group L1 reaching the closest focus position or the infinite focus position (if YES at step S309), control returns.

With the above described focus initializing process, in the multi-point distance measuring mode, the focusing lens group L1 is moved to the closest focus position as the initial position (search starting point) thereof regardless of the current position of the focusing lens group L1, while the infinite focus position is set as the search end extremity. On the other hand, in the spot distance measuring mode, the focusing lens group L1 is moved to one of the closest focus position and the infinite focus position as the initial position (search starting point) when the current position of the focusing lens group L1 is in the vicinity of the closest focus position and the infinite focus position, respectively, while the other of the closest focus position and the infinite focus position is set as the search end extremity.

[Peak Check Process]

Figure 8:
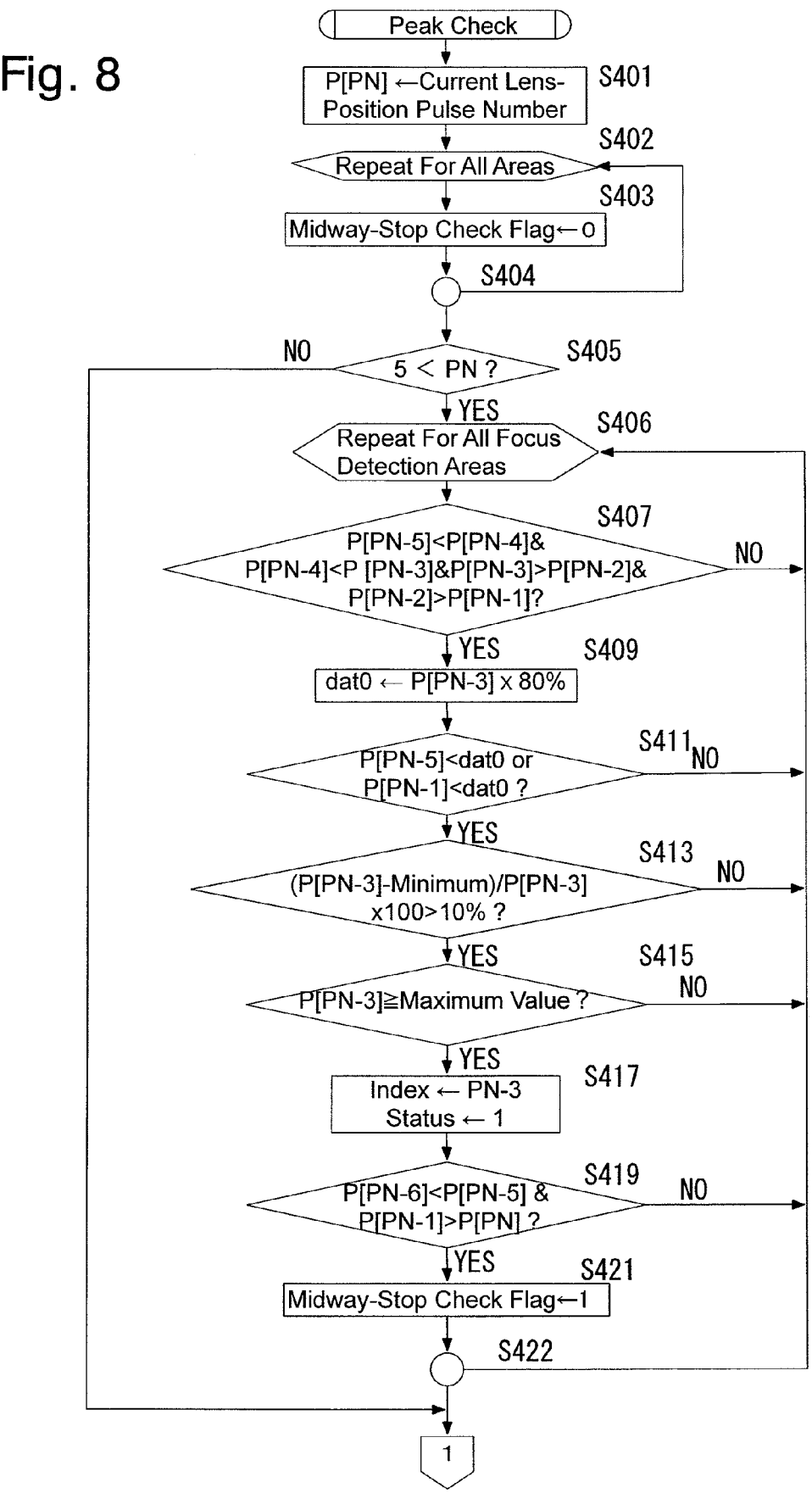
FIG. 8 is a flow chart showing the first half of a sub-routine "peak check process" performed in the contrast AF process shown in FIG. 5.
Figure 9:
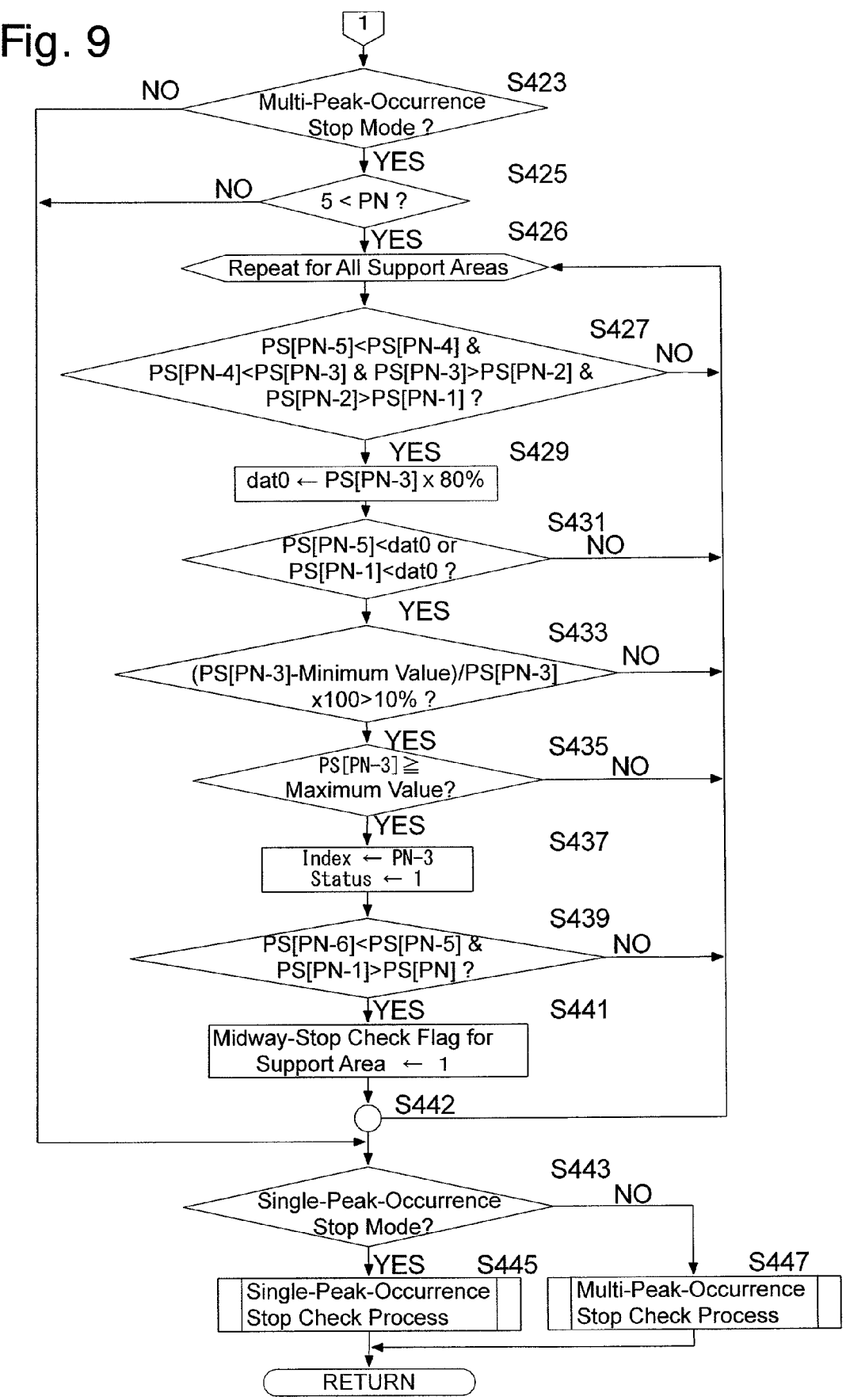
FIG. 9 is a flow chart showing the latter half of the sub-routine "peak check process" performed in the contrast AF process shown in FIG. 5.

The peak check process that is performed at step S117 will be hereinafter discussed in detail with reference to the flow chart shown in FIGS. 8 and 9. The peak check process is for determining a peak contract value in each focus detection area from the contrast value P[PN] on each lens-position pulse number PN which is obtained while moving the focusing lens group L1 stepwise. In the present embodiment of the digital camera, based on a group of obtained contrast values P[PN] at consecutive five lens positions (five stepping positions), contrast values at two adjacent lens positions of the focusing lens group L1 are compared with each other successively in the direction from the search starting point (initial position) toward the search end extremity of the focusing lens group L1, to determine whether or not the contrast value increases two times (first predetermined number of times) consecutively, and subsequently decreases two times (second predetermined number of times) consecutively, i.e., whether or not the contrast value of the middle (third) lens position of the five lens positions is a peak contrast value. Thereafter, in the case where the contrast value increases two times consecutively, and subsequently decreases two times consecutively, the maximum contrast value P[PN] at that time is determined to be a peak contrast (maximum value).

In the peak check process, firstly the current lens-position pulse number PN is assigned as a lens-position pulse number PN (step S401).

Subsequently, the midway-stop check flags set at each focus detection area and the associated support areas are all initialized (set to 0) (steps S402, S403 and S404). The midway-stop check flag is a flag for deterring a checking operation from being performed in which it is checked whether or not conditions of the midway stop of the search operation are satisfied for that area. Specifically, the midway-stop check flags "0" and "1" indicate determent and allowance, respectively.

Subsequently, it is determined whether or not the lens-position pulse number PN is greater than 5 (step S405). Namely, it is determined whether or not at least five consecutive positions necessary for calculating five peak contrast values at consecutive five lens positions are within a range in which contrast values can be obtained. If the lens-position pulse number PN is not greater than 5 (if NO at step S405), control proceeds to step S423 shown in FIG. 9. If the lens-position pulse number PN is greater than 5 (if YES at step S405), the operations at steps S407 through S421 are repeated for each focus detection area (step S406 through step S422).

It is determined whether or not the contrast value increases two times consecutively, and subsequently decreases two times consecutively based on a group of obtained five contrast values at consecutive five lens positions from the immediately preceding lens position (PN-1) to the four preceding lens position (PN-5) (step S407). Otherwise (if NO at step S407), control returns to step S406 so that the operation at step S407 is performed for the subsequent focus detection area.

If the contrast value increases two times consecutively, and subsequently decreases two times consecutively (if YES at step S407; see FIG. 14A), 80 percent of the contrast value (P[PN-3]) of the lens position (PN-3) that becomes a maximum value among the group of obtained five contrast values is assigned to a lower limit value dat0 (step S409). Subsequently, it is determined whether or not a first condition for reliability is satisfied, i.e., whether or not either the contrast value P[PN-5] at the lens position (PN-5), which is one of the opposite end positions of the five lens positions, or the contrast value P[PN-1] at the lens position (PN-1), which is the other of the opposite end positions of the five lens positions, is smaller than the lower limit value dat0 (step S411). Namely, it is determined whether or not the difference between the peak contrast value and each contrast value at the opposite end positions of the five lens positions is sufficiently large. If neither of the contrast value P[PN-5] at the lens position (PN-5) and the contrast value P[PN-1] at the lens position (PN-1) is smaller than the lower limit value dat0 (if NO at step S411), control returns to step S406 so that the operations at steps S407 through S411 are performed for the subsequent focus detection area. This is because it is assumed that the reliability of the peak contrast value is low since the contrast variation is small.

If either the contrast value P[PN-5] at the lens position (PN-5) or the contrast value P[PN-1] at the lens position (PN-1) is smaller than the lower limit value dat0 (if YES at step S411), it is determined whether or not a second condition for reliability is satisfied, i.e., whether or not the difference between the peak contrast value P[PN-3] and the minimum contrast value among all the contrast values obtained by the previous processes performed thus far is greater than 10 percent of the peak contrast value P[PN-3] (step S413). Otherwise (if NO at step S413), control returns to step S406 so that the operations at steps S407 through S413 are performed for the subsequent focus detection area. This is because it is assumed that the reliability of the peak contrast value is low since the peak contrast value is small.

If the difference between the peak contrast value P[PN-3] and the minimum contrast value among all the contrast values obtained by the previous processes performed thus far is greater than 10 percent of the peak contrast value P[PN-3] (if YES at step S413), it is determined whether or not a third condition for reliability is satisfied, i.e., whether or not the peak contrast value P[PN3] is equal to or greater than the maximum contrast value (step S415).

If the peak contrast value P[PN3] is not equal to or greater than the maximum contrast value (if NO at step S415), control returns to step S406 so that the operations at steps S407 through S415 are performed for the subsequent focus detection area.

If the peak contrast value P[PN3] is equal to or greater than the maximum contrast value (if YES at step S415), the lens-position pulse number (PN-3) at which the peak contrast value P[PN-3] has been obtained is assigned to a position index INDEX while a peak existence flag STATUS is set to "1" (step S417), and control proceeds to step S419.

It should be noted that the position index INDEX is a variable to which a lens-position pulse number for stopping the focus lens group L1 at a lens position thereof as an in-focus position is assigned and that the focusing lens group L1 is moved to the position of the lens-position pulse number represented by the set position index INDEX after the search operation is terminated. The peak existence flag STATUS is a flag for distinguishing whether or not a peak contrast value has been obtained.

At step S419 it is determined whether or not the contrast values P[PN-5] and P[PN-1], that are obtained at the opposite end positions of consecutive five lens positions at which a group of five contrast values are respectively obtained by the peak check process, are greater than the contrast values P[PN- 6] and P[PN], respectively, that are obtained at lens positions immediately after and before the aforementioned opposite end positions at which the contrast values P[PN-5] and P[PN-1] are obtained, respectively. Namely, it is determined whether or not the peak contrast value P[PN-3] is a peak contrast value obtained in the case where the contrast value increases three times consecutively, and subsequently decreases three times consecutively (see FIG. 14B). If the peak contrast value P[PN-3] is such a peak contrast value (if YES at step S419), the midway-stop check flag is set to "1" (step S421) and control proceeds to step S423. If the peak contrast value P[PN-3] is not such a peak contrast value (if NO at step S419), control returns to step S406 so that the operations at steps S407 through S419 are performed for the subsequent focus detection area. Since strict conditions are set up in the case of terminating the search operation during the progress thereof, the possibility of an error focusing occurring is low.

Upon the operations at steps S406 through S421 being performed on all the focus detection areas MM0 through MM4 or the focus detection area SM0, control proceeds to step S423 from step S422. It is determined at step S423 whether or not the digital camera is currently in the multi-peak-occurrence stop mode. If the digital camera is not currently in the multi-peak-occurrence stop mode (if NO at step S423), control proceeds to step S443. If the digital camera is currently in the multi-peak-occurrence stop mode (if YES at step S423), control proceeds to step S425. The process from step S425 to S442 is substantially the same as the process from step S405 to step S422 and performed on all the support areas MS0 through MS5 or the support areas SS0 and SS1.

It is determined at step S425 whether or not the lens-position pulse number PN is greater than 5. Namely, it is determined whether or not at least five consecutive positions necessary for calculating five peak contrast values at consecutive five lens positions are within a range in which contrast values can be obtained. If the lens-position pulse number PN is not greater than 5 (if NO at step S425), control proceeds to step S443. If the lens-position pulse number PN is greater than 5 (if YES at step S425), the operations at steps S427 through S441 are repeated for each support area (step S426 through step S442).

It is determined whether or not the contrast value increases two times consecutively, and subsequently decreases two times consecutively based on a group of obtained five contrast values at consecutive five lens positions from the immediately preceding lens position (PN-1) to the four preceding lens position (PN-5) (step S427). Otherwise (if NO at step S427), control returns to step S426 so that the operation at step S427 is performed for the subsequent support area, or proceeds to step S443 in the case of the last support area (steps S426 through S442, and step S443).

If the contrast value increases two times consecutively, and subsequently decreases two times consecutively (if YES at step S427), 80 percent of the contrast value (P[PN-3]) of the lens position (PN-3) that becomes a maximum value among the group of obtained five contrast values is assigned to the lower limit value dat0 (step S429). Subsequently, it is determined whether or not a first condition for reliability is satisfied, i.e., whether or not either the contrast value P[PN-5] at the lens position (PN-5), which is one of the opposite end positions of the five lens positions, or the contrast value P[PN-1] at the lens position (PN-1), which is the other of the opposite end positions of the five lens positions, is smaller than the lower limit value dat0 (step S431). Namely, it is determined whether or not the difference between the peak contrast value and each contrast value at the opposite end positions of the five lens positions is sufficiently large. If neither of the contrast value P[PN-5] at the lens position (PN-5) and the contrast value P[PN-1] at the lens position (PN-1) is smaller than the lower limit value dat0 (if NO at step S431), control returns to step S426 so that the operations at steps S427 through S431 are performed for the subsequent support area. This is because it is assumed that the reliability of the peak contrast value is low since the contrast variation is small.

If either the contrast value P[PN-5] at the lens position (PN-5) or the contrast value P[PN-1] at the lens position (PN-1) is smaller than the lower limit value dat0 (if YES at step S431), it is determined whether or not a second condition for reliability is satisfied, i.e., whether or not the difference between the peak contrast value P[PN-3] and the minimum contrast value among all the contrast values obtained by the previous processes performed thus far is greater than 10 percent of the peak contrast value P[PN-3] (step S433). Otherwise (if NO at step S433), control returns to step S426 so that the operations at steps S427 through S433 are performed for the subsequent support area. This is because it is assumed that the reliability of the peak contrast value is low since the peak contrast value is small.

If the difference between the peak contrast value P[PN-3] and the minimum contrast value among all the contrast values obtained by the previous processes performed thus far is greater than 10 percent of the peak contrast value P[PN-3] (if YES at step S433), it is determined whether or not a third condition for reliability is satisfied, i.e., whether or not the peak contrast value P[PN3] is equal to or greater than the maximum contrast value (step S435). If the peak contrast value P[PN3] is not equal to or greater than the maximum contrast value (if NO at step S435), control returns to step S426 so that the operations at steps S427 through S435 are performed for the subsequent support area. If the peak contrast value P[PN3] is equal to or greater than the maximum contrast value (if YES at step S435), the lens-position pulse number (PN-3) at which the peak contrast value P[PN-3] has been obtained is assigned to the position index INDEX while the peak existence flag STATUS is set to "1" (step S437), and control proceeds to step S439.

At step S439 it is determined whether or not the contrast values P[PN-5] and P[PN-1], that are obtained at the opposite end positions of consecutive five lens positions at which a group of five contrast values are respectively obtained by the peak check process, are greater than the contrast values P[PN-6] and P[PN], respectively, that are obtained at lens positions immediately after and before the aforementioned opposite end positions at which the contrast values P[PN-5] and P[PN-1] are obtained, respectively. Namely, it is determined whether or not the peak contrast value P[PN-3] is a peak contrast value obtained in the case where the contrast value increases three times consecutively, and subsequently decreases three times consecutively. If the peak contrast value P[PN-3] is such a peak contrast value (if YES at step S439), the midway-stop check flag for support area is set to "1" (step S441) and control proceeds to step S443. If the peak contrast value P[PN-3] is not such a peak contrast value (if NO at step S439), control returns to step S426 so that the operations at steps S427 through S439 are performed for the subsequent support area. Since strict conditions are set up in the case of terminating the search operation during the progress thereof, the possibility of an error focusing occurring is low.

At step S443 it is determined whether or not the digital camera is currently in the single-peak-occurrence stop mode. If the digital camera is currently in the single-peak-occurrence stop mode (if YES at step S443), a single-peak-occurrence stop check process is performed (S445), and control returns. If the digital camera is not currently in the single-peak-occurrence stop mode (if NO at step S443), a multi-peak-occurrence stop check process is performed (S447), and control returns.

[Single-Peak-Occurrence Stop Check Process]

Figure 10:
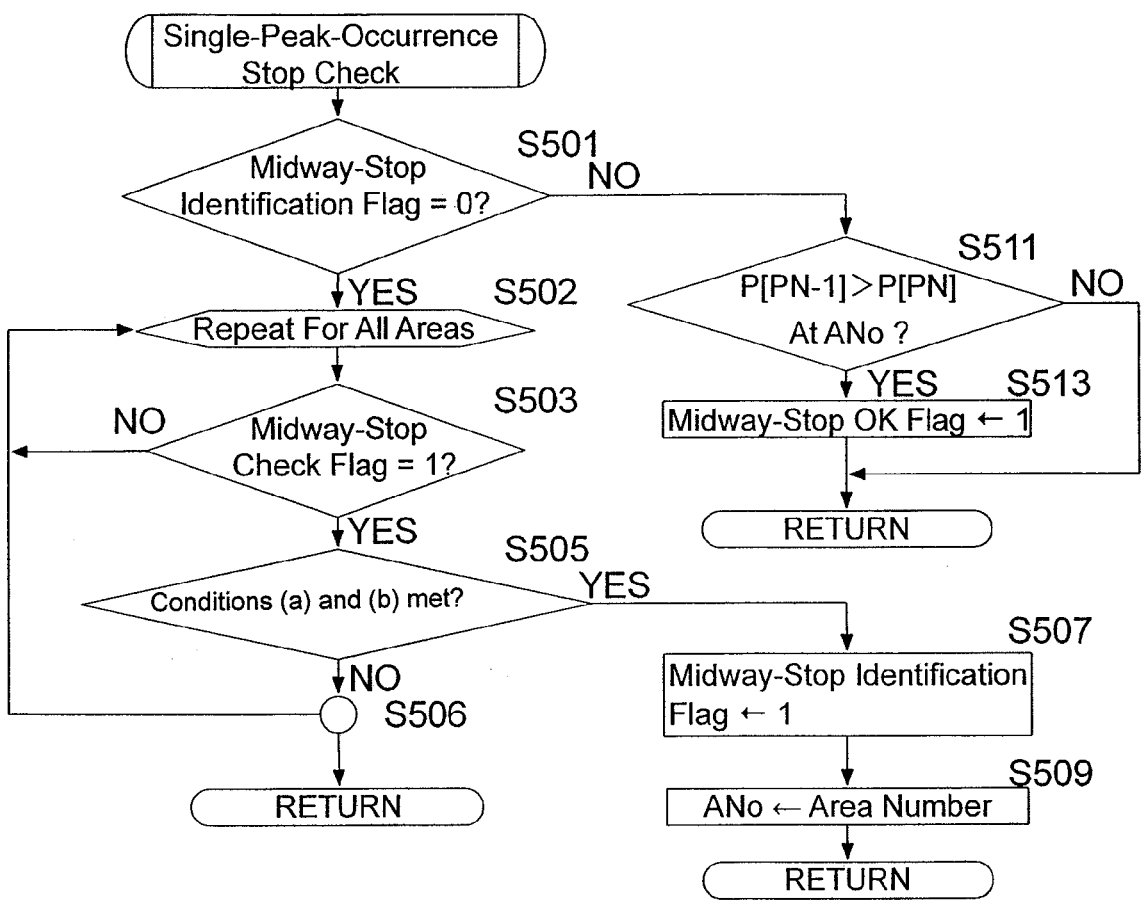
FIG. 10 is a flow chart showing a sub-routine "single-peak-occurrence stop check process" performed in the peak check process shown in FIG. 9.

The single-peak-occurrence stop check process that is performed at step S445 will be hereinafter discussed in detail with reference to the flow chart shown in FIG. 10. In this process, firstly it is determined whether or not the midway-stop identification flag is "0" (step S501). The midway-stop identification flag is "0" when control first enters the single-peak-occurrence stop check process, so that control proceeds to a loop process at steps S502 through S506.

In the loop process at steps S502 through S506, it is determined whether or not the midway-stop check flag is "1" for each area (step S503). The area for which the midway-stop check flag is set to "1" is the area on which it is determined that the peak contrast value P[PN-3] is a peak contrast value obtained in the case where the contrast value increases three times consecutively, and subsequently decreases three times consecutively, and for which the midway-stop check flag is set to "1" at step S441. If it is determined at step S503 that the midway-stop check flag is not "1" (if NO at step S503), control returns to step S502 and it is determined whether or not the midway-stop check flag is "1" for the subsequent area (step S503).

If it is determined at step S503 that the midway-stop check flag is "1" (if YES at step S503), it is determined whether or not all the following three conditions (a) and (b) are satisfied (step S505):

(a) No peak contrast exists in the vicinity of the closest focus position (near extremity) of the focusing lens group L1 in any other focus detection area (b) A peak contrast exists within plus or minus 1 pulse position even if existing in any other focus detection area.

If the additional conditions (a) or (b) are not satisfied (if NO at step S505), control returns to step S502 so that the operations at steps S503 and S505 are performed for the subsequent area. If all the areas do not satisfy the two conditions (a) and (b), control returns.

If any area satisfies both of the two conditions (a) and (b) (if YES at step S505), the midway-stop identification flag is set to "1" (step S507), the area number of this area is assigned to an area number ANo (step S509), and control returns. Thereafter, the focus detected area represented by the area number ANo is selected as an in-focus area in the area selection process at step S127 (see FIG. 5).

If the midway-stop identification flag is "1" (if NO at step S501), it is determined whether or not the contrast value P[PN] at the current position of the focusing lens group L1 is smaller than the contrast value P[PN-1] at the immediately preceding position of the focusing lens group L1 (step S511) If the contrast value P[PN] is smaller than the contrast value P[PN-1] (if YES at step S511), the midway-stop OK flag is set to "1" (step S513), and control returns. If the contrast value P[PN] is not smaller than the contrast value P[PN-1] (if NO at step S511), control simply returns.

It is determined at step S501 that the midway-stop identification flag is "1" when control enters the single-peak-occurrence stop check process for the second time or more, after the midway-stop identification flag is set to "1" at step S507.

Figure 14B:
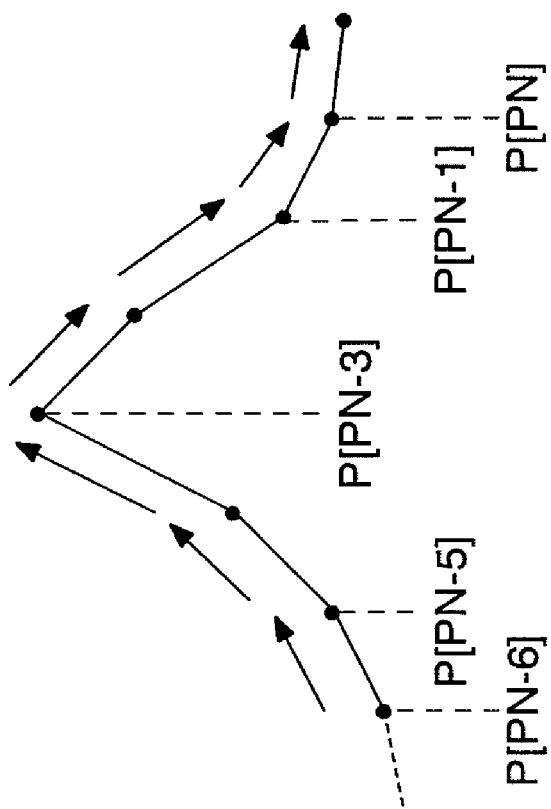
FIGS. 14A and 14B are graphs showing examples of contrast values detected as in-focus positions by the contrast AF process to illustrate the relationship between different positions of the focusing lens group and the respective contrast values thereat in the contrast AF mode.
Figure 14A:
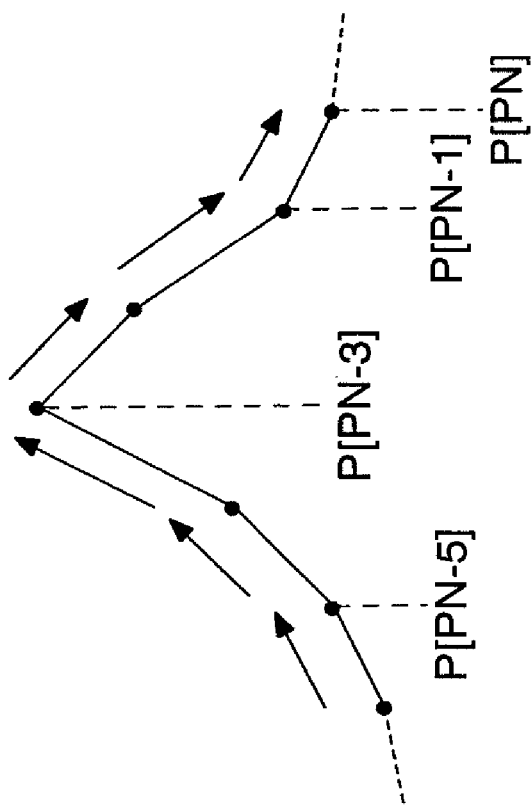

It is determined at step S511 that the contrast value P[PN] is smaller than the contrast value P[PN-1] when the contrast value decreases four times consecutively from a peak contrast (see FIG. 14B).

[Multi-Peak-Occurrence Stop Check Process]

Figure 11:
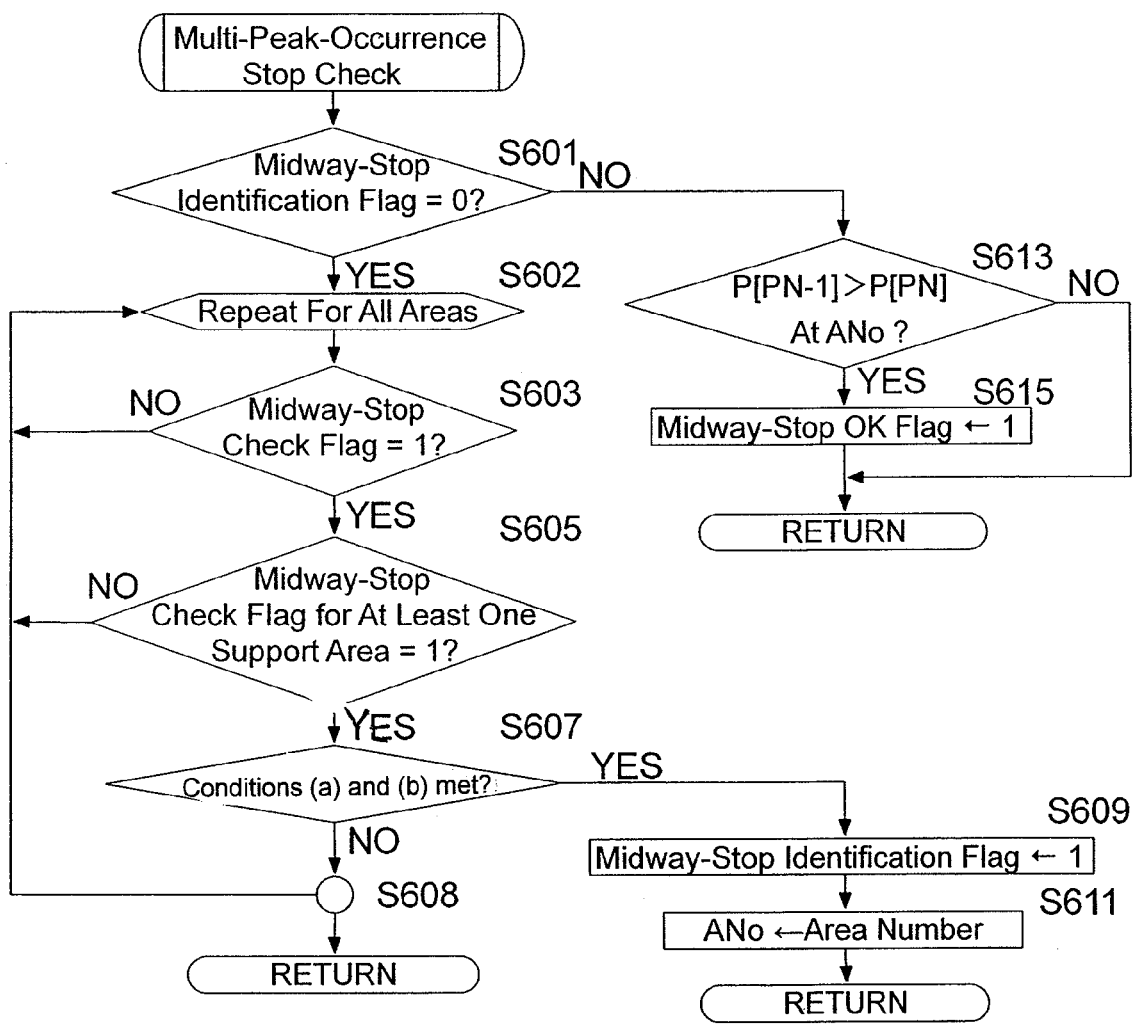
FIG. 11 is a flow chart showing a sub-routine "multi-peak-occurrence stop check process" performed in the peak check process shown in FIG. 9.

The multi-peak-occurrence stop check process that is performed at step S447 will be hereinafter discussed in detail with reference to the flow chart shown in FIG. 11.

In this process, firstly it is determined whether or not the midway-stop identification flag is "0" (step S601). The midway-stop identification flag is "0" when control first enters the multi-peak-occurrence stop check process, so that control proceeds to a loop process at steps S602 through S608.

In the loop process at steps S602 through S608, it is determined whether or not the midway-stop check flag is "1" for each area (step S603). The area for which the midway-stop check flag is set to "1" is the area on which it is determined that the peak contrast value P[PN-3] is a peak contrast value obtained in the case where the contrast value increases three times consecutively, and subsequently decreases three times consecutively, and for which the midway-stop check flag is set to "1" at step S441. If it is determined at step S603 that the midway-stop check flag is not "1" (if NO at step S603), control returns to step S602 and it is determined whether or not the midway-stop check flag is "1" for the subsequent area (step S603).

If it is determined at step S603 that the midway-stop check flag is "1" (if YES at step S603), it is determined whether or not the midway-stop check flag is "1" for the two support areas of the currently-checked focus detection area (step S605) If the midway-stop check flag is not "1" for either of the two support areas of the currently-checked focus detection area (if NO at step S605), control returns to step S602 so that the operations at steps S603 and S605 are performed for the subsequent focus detection area.

If it is determined at step S605 that the midway-stop check flag is "1" for at least one of the two support areas of the currently-checked focus detection area (if YES at step S605), it is determined whether or not the above described additional two conditions (a) and (b) are satisfied (step S607).

If the conditions (a) or (b) are not satisfied (if NO at step S607), control returns to step S602 so that the operations at steps S603 through S607 are performed for the subsequent focus detection area. If all the focus detection areas do not satisfy both the two conditions (a) and (b), control returns.

If both the two conditions (a) and (b) are satisfied (if YES at step S607), the midway-stop identification flag is set to "1" (step S609), the area number of this focus detection area is assigned to the area number ANo (step S611), and control returns. Thereafter, the focus detected area represented by the area number ANo is selected as an in-focus area in the area selection process at step S127.

If the midway-stop identification flag is "1" (if NO at step S601), it is determined whether or not the contrast value P[PN] at the current position of the focusing lens group L1 is smaller than the contrast value P[PN-1] at the immediately preceding position of the focusing lens group L1 (step S613). If the contrast value P[PN] is smaller than the contrast value P[PN-1] (if YES at step S613), the midway-stop OK flag is set to "1" (step S615), and control returns. If the contrast value P[PN] is not smaller than the contrast value P[PN-1] (if NO at step S613), control simply returns.

It is determined at step S601 that the midway-stop identification flag is "1" when control enters the multi-peak-occurrence stop check process for the second time or more, after the midway-stop identification flag is set to "1" at step S609.

It is determined at step S613 that the contrast value P[PN] is smaller than the contrast value P[PN-1] when the contrast value decreases four times consecutively from a peak contrast (see FIG. 14B).

If the midway-stop OK flag is set to "1" by the single-peak-occurrence stop check process or the multi-peak-occurrence stop check process therein, control returns to the contrast AF process shown in FIG. 5, goes from step S119 to step S123, and control ends via steps S125 through S129 to complete the search operation.

In the present embodiment of the digital camera to which the focus detecting method according to the present invention is applied, an object at the closest focus position (shortest object distance) can be brought into focus with reliability because the search operation is performed from the closest focus position toward the infinite focus position regardless of the current position of the focusing lens group L1 when the digital camera is in the multi-point distance measuring mode. When the digital camera is in the spot distance measuring mode, the search operation is performed in which the focusing lens group L1 is firstly moved to one of the opposite ends of the range of movement thereof (the closest focus position or the infinite focus position) which is closer to the current position of the focusing lens group L1 and subsequently moved toward the other end of the range of movement of the focusing lens group L1, which makes it possible to reduce the time required to bring an object at the closest focus position (shortest object distance) into focus.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A focus detection method for detecting a focus state based on an object image formed through a photographing optical system in one of a single-point distance measuring mode and a multi-point distance measuring mode while performing a search operation in which a focusing lens group of said photographing optical system is moved between a near extremity and a far extremity, said focus detection method comprising:

moving, in said multi-point distance measuring mode, said focusing lens group always from said near extremity toward said far extremity in said search operation, and stopping said focusing lens group upon first detecting an in-focus state to determine an in-focus position of said focusing lens group when detecting a focus state in each of a plurality of focus detection areas while performing said search operation, and moving, in said single-point distance measuring mode, said focusing lens group firstly to one of said near extremity and said far extremity which is closer to a current position of said focusing lens group, and subsequently toward the other of said near extremity and said far extremity in said search operation, and stopping said focusing lens group upon first detecting an in-focus state to determine an in-focus position of said focusing lens group when detecting a focus state in said single focus detection area while performing said search operation.

2. The focus detection method according to claim 1, wherein said focus detection method is based on a contrast AF system which detects contrasts of an image while moving said focusing lens group stepwise and determines a position of said focusing lens group at which a peak contrast is obtained to be an in-focus position of said focusing lens group.

3. The focus detection method according to claim 1, further comprising:

moving said focusing lens group to said in-focus position upon determining said position of said focusing lens group, at which said in-focus state is detected, to be said in-focus position of said focusing lens group.

4. The focus detection method according to claim 1, wherein one of said plurality of focus detection areas serves as said spot focus detection area.

5. The focus detection method according to claim 1, wherein said focusing lens group is moved stepwise by a stepping motor.

6. A focus detection device comprising:

an image pickup device which converts an object image that is formed via a photographing optical system into electrical image data;

a lens driving device which moves a focusing lens group of said photographing optical system; and a controller that detects a focus state based on image data, converted by said image pickup device, in one of a single-point distance measuring mode while performing a search operation in which said focusing lens group of said photographing optical system is moved between a near extremity and a far extremity toward the other via said lens driving device, wherein, in said multi-point distance measuring mode, said controller moves said focusing lens group always from said near extremity toward said far extremity in said search operation, and stops said focusing lens group upon first detecting an in-focus state to determine a position of said focusing lens group at which said in-focus state is detected to be an in-focus position of said focusing lens group when detecting a focus state in each of a plurality of focus detection areas while performing said search operation, and wherein, in said single-point distance measuring mode, said controller moves said focusing lens group firstly to one of said near extremity and said far extremity which is closer to a current position of said focusing lens group, and subsequently toward the other of said near extremity and said far extremity in said search operation, and stops said focusing lens group upon first detecting an in-focus state to determine a position of said focusing lens group at which said in-focus state is detected to be an in-focus position of said focusing lens group when detecting a focus state in a spot focus detection area while performing said search operation.

* * * * *